United States Patent
Kim

(10) Patent No.: US 10,387,096 B2
(45) Date of Patent: Aug. 20, 2019

(54) ELECTRONIC DEVICE HAVING MULTIPLE DISPLAYS AND METHOD FOR OPERATING SAME

(71) Applicant: SAMSUNG ELECTRONICS CO., LTD., Suwon-si, Gyeonggi-do (KR)

(72) Inventor: Cha Kyum Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 175 days.

(21) Appl. No.: 15/342,417

(22) Filed: Nov. 3, 2016

(65) Prior Publication Data

US 2017/0123748 A1    May 4, 2017

(30) Foreign Application Priority Data

Nov. 3, 2015 (KR) .......................... 10-2015-0153854

(51) Int. Cl.
  *G06F 3/14*   (2006.01)
  *G06F 3/0362*   (2013.01)
  *G06F 1/16*   (2006.01)
  *G06F 3/0346*   (2013.01)

(52) U.S. Cl.
  CPC .......... *G06F 3/1423* (2013.01); *G06F 1/1681* (2013.01); *G06F 3/0346* (2013.01); *G06F 3/0362* (2013.01)

(58) Field of Classification Search
  CPC .... G06F 1/1681; G06F 3/0346; G06F 3/0362; G06F 3/1423
  See application file for complete search history.

(56) References Cited

U.S. PATENT DOCUMENTS

| | | | |
|---|---|---|---|
| 9,009,984 B2 | 4/2015 | Caskey et al. | |
| 2009/0244012 A1* | 10/2009 | Behar | G06F 1/162 345/169 |
| 2010/0064536 A1* | 3/2010 | Caskey | G06F 1/1616 33/303 |
| 2014/0009877 A1* | 1/2014 | Okamoto | G06F 1/1616 361/679.01 |
| 2016/0085319 A1* | 3/2016 | Kim | G06F 3/0346 345/156 |
| 2017/0052566 A1* | 2/2017 | Ka | G06F 3/0483 |

* cited by examiner

*Primary Examiner* — Afroza Chowdhury
(74) *Attorney, Agent, or Firm* — Nixon & Vanderhye P.C.

(57) ABSTRACT

Disclosed is a method for operating an electronic device. A method for operating an electronic device may include: determining an angle between a first body and a second body in an electronic device including the first body having a first display and the second body having a second display, the second body being rotatably connected to the first body; determining a movement state of the electronic device; and displaying a first screen on the first display and displaying a second screen on the second display based on the determined movement state of the electronic device and the determined angle.

17 Claims, 15 Drawing Sheets

ELECTRONIC DEVICE HAVING MULTIPLE DISPLAYS AND METHOD FOR OPERATING SAME

CROSS-REFERENCE TO RELATED APPLICATION

This application is based on and claims priority under 35 U.S.C. § 119 to Korean Application Serial No. 10-2015-0153854, which was filed in the Korean Intellectual Property Office on Nov. 3, 2015, the disclosure of which is incorporated by reference herein in its entirety.

TECHNICAL FIELD

Various embodiments of the present disclosure relate generally to an electronic device having multiple displays and a method for operating the same and, for example, to an electronic device that displays various screens on multiple displays according to various states of the electronic device, respectively, and a method for operating the same.

BACKGROUND

The electronic device may display various pieces of information and contents through the display, and receive various inputs through the display.

Accordingly, a display of the electronic device functions as a display device for displaying a screen and as an input device for receiving an input at the same time.

In addition, with the development of display technologies, a display having a big screen and a clearer picture quality has been applied to the electronic device.

Users of the electronic device are using the electronic device in various locations and places, and therefore the electronic device is being used in various formats.

For example, the user may use the electronic device with one hand while supporting the electronic device with the other hand or both hands, or the electronic device is put on a table or a desk during its use.

As the display of the electronic device has various roles, it is required to provide multiple displays on the electronic device rather than having only a single display that has limitations in its use.

For the electronic device provided with multiple displays, when the displays are used as a display device or an input device in the same method or format as the electronic device having a single display, it is difficult to properly use the advantage of the electronic device having multiple displays.

SUMMARY

Accordingly, when the electronic device is provided with multiple displays, an electronic device and an operation method therefor are required, which can efficiently use each of the multiple displays according to a use pattern of the electronic device having the multiple displays provided therein.

In various example embodiments of the present disclosure, various screens can be displayed on each of the multiple displays provided in an electronic device on the basis of various states of the electronic device.

In addition, according to various example embodiments of the present disclosure, an electronic device may display, on each of multiple displays, a screen corresponding to at least one of an angle between multiple bodies of an electronic device having multiple displays, the movement state of the electronic device, and a function being operated in the electronic device.

Therefore, according to various example embodiments of the present disclosure, an electronic device may display, on multiple displays, multiple screens corresponding to the movement state of the electronic device, respectively, so as to provide a screen that is optimized for the movement state of the electronic device, and may display, on the multiple displays, screens that are appropriate for the user's purpose, respectively, to improve the user convenience.

In various example embodiments of the present disclosure, a method for operating an electronic device may include: determining an angle between a first body and a second body in an electronic device, the first body having a first display and the second body having a second display, which is rotatably connected to the first body; determining a movement state of the electronic device; and displaying a first screen on the first display and displaying a second screen on the second display based on the determined movement state of the electronic device and the determined angle.

In various example embodiments of the present disclosure, an electronic device may include: multiple displays including a first display and a second display; a first body including the first display; a second body including the second display, is the second body being rotatably coupled to the first body; a sensor configured to sense a movement state of the electronic device; a memory; and a processor electrically connected to the memory, wherein the memory stores instructions which, when executed by the processor, cause the processor to perform operations including: determining an angle between the first body and the second body and a movement state of the electronic device on the basis of a sensing value sensed by the sensor; and displaying a first screen on the first display and displaying a second screen on the second display based on the determined movement state of the electronic device and the determined angle.

In various example embodiments of the present disclosure, an electronic device may include: a display capable of being configured into multiple areas; a sensor configured to sense a movement state of the electronic device; a memory; and a processor electrically connected to the memory, wherein the display includes a first display including a plurality of first display areas and a second display including a plurality of second display areas, the first and second displays being rotatably connected to each other, and the memory stores instructions which, when executed by the processor, cause the processor to perform operations including: determining an angle between the first display area and the second display area and a movement state of the electronic device on the basis of a sensing value sensed by the sensor; and displaying a first screen on the first display area and displaying a second screen on the second display area based on the determined movement state of the electronic device and the determined angle.

According to various example embodiments of the present disclosure, screens corresponding to the movement state of the electronic device, such as a portable state or a mounted state, can be displayed on multiple displays, respectively. Accordingly, an electronic device according to various embodiments of the present disclosure may efficiently utilize each of multiple displays depending on the use pattern of the electronic device. Further, the present disclosure may determine the movement state of the electronic device through various methods of the electronic device, so that a screen that is appropriate for the movement state of the electronic device can be provided. In addition, the present disclosure may display, on each of the multiple displays, a screen appropriate for the user's usage based on the movement state of the electronic device, so that the user convenience can be improved.

BRIEF DESCRIPTION OF THE DRAWINGS

The above and other aspects, features, and advantages of the present disclosure will be more apparent from the following detailed description, taken in conjunction with the accompanying drawings, in which like reference numerals refer to like elements, and wherein.

DETAILED DESCRIPTION

Figure 1:
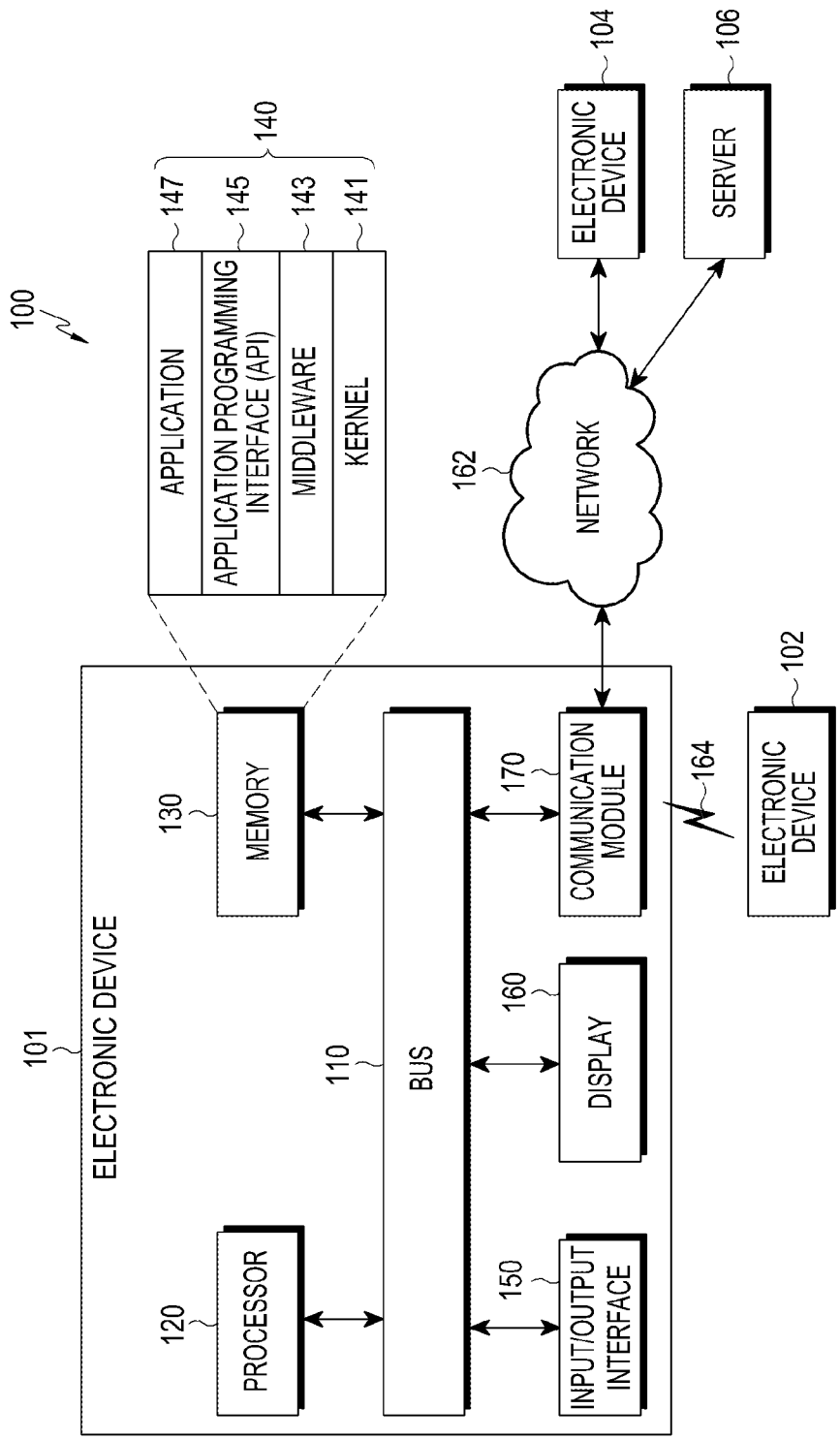
FIG. 1 is a block diagram illustrating an example electronic device and a network according to various example embodiments of the present disclosure.

Hereinafter, various example embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled to the other element or any other element (e.g., third element) may be interposed between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "appropriate for", "having the capacity to", "designed to", "adapted to", "made to", or "capable of" according to the situation. The term "configured to" may not necessarily imply "specifically designed to" in hardware. Alternatively, in some situations, the expression "device configured to" may refer, for example, to a situation in which the device, together with other devices or components, "is able to". For example, the phrase "processor adapted (or configured) to perform A, B, and C" may refer, for example, to processing circuitry, e.g., a dedicated processor (e.g. embedded processor) for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various embodiments, the wearable device may include at least one of an accessory type (e.g., a watch, a ring, a bracelet, an anklet, a necklace, glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto.

According to some embodiments, the electronic device may be a home appliance. The home appliance may include at least one of, for example, a television, a Digital Video Disc (DVD) player, a stereo, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Device, an electronic device for a ship (e.g., a navigation device for a ship, and a gyro-compass), avionics, security devices, an automotive head unit, a robot for home or industry, an automatic teller machine (ATM) in banks, point of sales (POS) in a shop, or an Internet of things device (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. In various embodiments, the electronic device may be a combination of one or more of the aforementioned various devices. According to some embodiments, the electronic device may also be a flexible device. Further, the electronic device according to an embodiment of the present disclosure is not limited to the aforementioned devices, and may include a new electronic device according to the development of technology.

Hereinafter, an electronic device according to various example embodiments will be described with reference to the accompanying drawings. In the present disclosure, the term "user" may indicate a person using an electronic device or a device (e.g., an artificial intelligence electronic device) using an electronic device.

Referring to FIG. 1, an electronic device 101 within a network environment 100 according to various example embodiments will be described. The electronic device 101 may include a bus 110, a processor 120, a memory 130, an input/output interface (e.g., including input/output circuitry) 150, a display 160, and a communication module (e.g., including communication circuitry) 170. In some embodiments, the electronic device 101 may omit at least one of the elements, or may further include other elements.

The bus 110 may include, for example, a circuit for connecting the components 110 to 170 and transmitting communication (for example, control messages and/or data) between the components.

The processor 120 may include one or more of a Central Processing Unit (CPU), an Application Processor (AP), and a Communication Processor (CP). For example, the processor 120 may carry out operations or data processing relating to the control and/or communication of at least one other element of the electronic device 101.

The memory 130 may include a volatile and/or non-volatile memory. The memory 130 may store, for example, instructions or data relating to at least one other element of the electronic device 101. According to an embodiment, the memory 130 may store software and/or a program 140. The program 140 may include a kernel 141, middleware 143, an Application Programming Interface (API) 145, and/or application programs (or "applications") 147. At least some of the kernel 141, the middleware 143, and the API 145 may be referred to as an Operating System (OS).

The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

Furthermore, the middleware 143 may process one or more task requests, which are received from the application programs 147, according to priorities thereof. For example, the middleware 143 may assign priorities for using the system resources (e.g., the bus 110, the processor 120, the memory 130, etc.) of the electronic device 101 to one or more of the application programs 147. For example, the middleware 143 may perform scheduling or load balancing on the one or more task requests by processing the one or more task requests according to the priorities assigned thereto.

The API 145, which is an interface through which the applications 147 control functions provided from the kernel 141 or the middleware 143, may include, for example, at least one interface or function (e.g., instruction) for file control, window control, image processing, text control, etc.

The input/output interface 150 may include various input/output circuitry and may function as, for example, an interface that can forward instructions or data, which are input from a user or an external device, to the other element(s) of the electronic device 101. Furthermore, the input/output interface 150 may output the instructions or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a Micro-ElectroMechanical Systems (MEMS) display, and an electronic paper display. The display 160 may display, for example, various types of contents (e.g., text, images, videos, icons, or symbols) to the user. The display 160 may include a touch screen and receive, for example, a touch, gesture, proximity, or hovering input using an electronic pen or the user's body part.

The communication interface 170 may include various communication circuitry that provides communication, for example, between the electronic device 101 and an external device (e.g., a first external electronic device 102, a second external electronic device 104, or a server 106). For example, the communication interface 170 may be connected to a network 162 through wireless or wired communication to communicate with the external device (for example, the second external electronic device 104 or the server 106). For example, the communication interface 170 may be connected to the first external electronic device 102 through wireless or wired communication 164 to communicate with the first external electronic device 102.

The wireless communication may use, for example, at least one of Long Term Evolution (LTE), LTE-Advance (LTE-A), Code Division Multiple Access (CDMA), Wideband CDMA (WCDMA), Universal Mobile Telecommunications System (UNITS), WiBro (Wireless Broadband), Global System for Mobile Communications (GSM), and the like, as a cellular communication protocol. In addition, the wireless communication may include, for example, short range communication 164. The short range communication 164 may include, for example, at least one of Wi-Fi, Bluetooth, Near Field Communication (NFC), Global Navigation Satellite System (GNSS), etc. The GNSS may include at least one of, for example, a Global Positioning System (GPS), a Global navigation satellite system (Glonass), a Beidou navigation satellite system (hereinafter, referred to as "Beidou"), and Galileo (European global satellite-based navigation system). Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), a Plain Old Telephone Service (POTS), etc. The network 462 may include at least one of a communication network such as a computer network (e.g., a LAN or a WAN), the Internet, and a telephone network.

Each of the first and second external electronic devices 102 and 104 may be of a type identical to or different from that of the electronic device 101. According to an embodiment, the server 106 may include a group of one or more servers. According to various embodiments of the present disclosure, all or some of operations performed by the electronic device 101 may be performed by another electronic device or multiple electronic apparatuses (e.g., the first and second external electronic apparatuses 103 and 104 or the server 106). According to an embodiment, when the electronic device 101 has to perform some functions or services automatically or in response to a request, the electronic device 101 may request another device (e.g., the electronic device 102 or 104 or the server 106) to perform at least some functions relating thereto instead of, or in addition to, performing the functions or services by itself. Another electronic device (e.g., the electronic devices 102 and 104) may execute the requested functions or the additional functions, and may deliver a result of the execution to the electronic device 101. The electronic device 101 may provide the received result as it is, or may additionally process the received result to provide the requested functions or services. To this end, for example, cloud computing, distributed computing, or client-server computing technology may be used.

Figure 2:
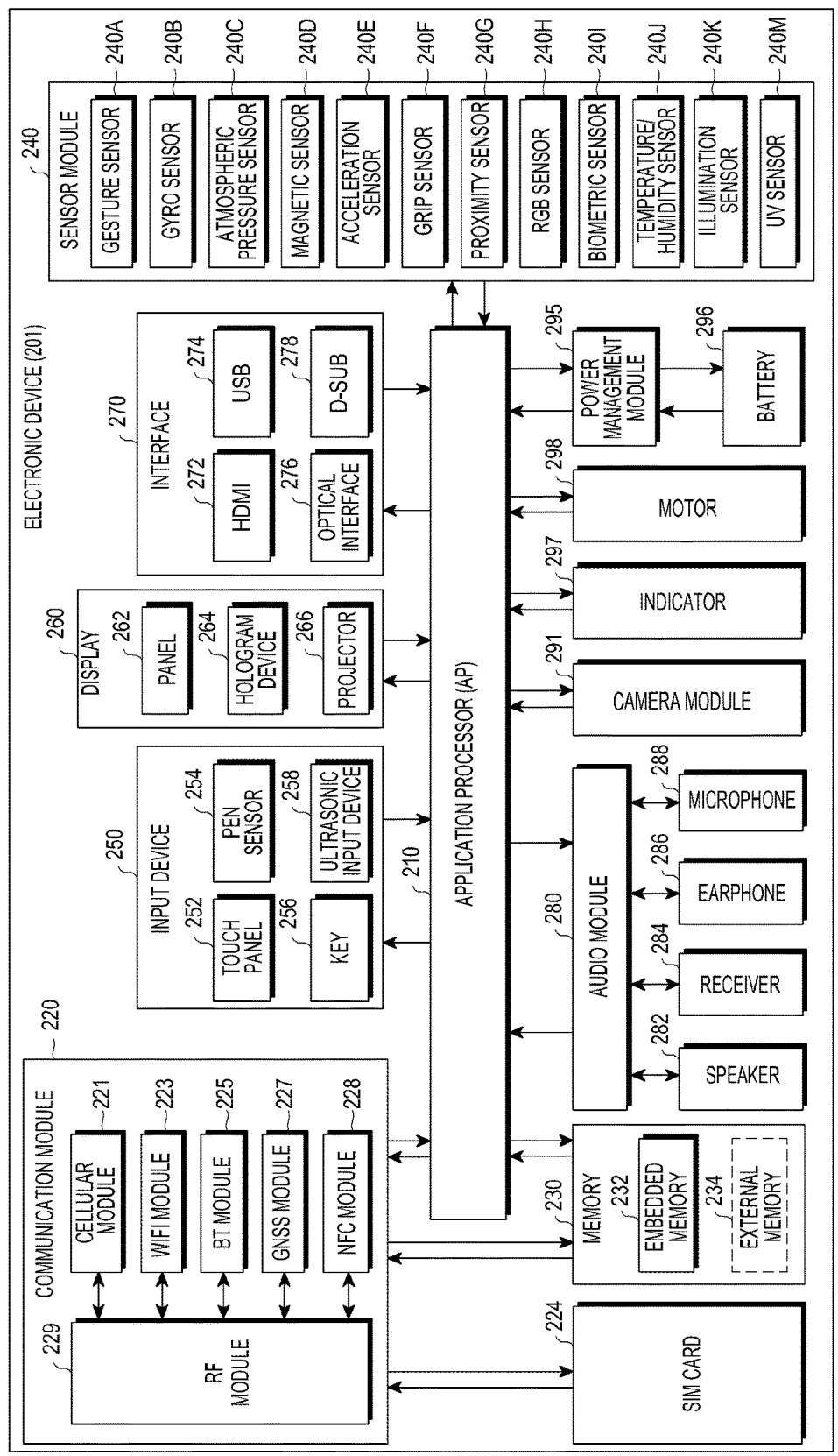
FIG. 2 is a block diagram illustrating an example electronic device according to various example embodiments of the present disclosure.

FIG. 2 is a block diagram illustrating an example electronic device 201 according to various example embodiments of the present disclosure. The electronic device 201 may include, for example, the entirety or a part of the electronic device 101 illustrated in FIG. 1. The electronic device 201 may include at least one Application Processor (AP) (e.g., including processing circuitry) 210, a communication module (e.g., including communication circuitry) 220, a Subscriber Identification Module (SIM) card 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may drive, for example, an operating system or application programs to control a plurality of hardware or software elements connected thereto and may perform various types of data processing and operations. The processor 210 may be embodied, for example, as a processor including processing circuitry, a System on Chip (SoC), or the like, but is not limited thereto. According to an embodiment, the processor 210 may further include a Graphic Processing Unit (GPU) and/or an image signal processor. The processor 210 may also include at least some (e.g., a cellular module 221) of the elements illustrated in FIG. 2. The processor 210 may load, in a volatile memory, instructions or data received from at least one of the other elements (e.g., a non-volatile memory) to process the loaded instructions or data, and may store various types of data in the non-volatile memory.

The communication module 220 may have a configuration equal or similar to that of the communication interface 170 of FIG. 1. The communication module 220 may include, various communication circuitry, such as, for example, and without limitation, a cellular module 221, a Wi-Fi module 223, a BT module 225, a GNSS module 227 (for example, a GPS module, a Glonass module, a Beidou module, or a Galileo module), an NFC module 228, and a Radio Frequency (RF) module 229.

The cellular module 221 may provide, for example, a voice call, a video call, a text message service, an Internet service, etc. through a communication network. According to an embodiment, the cellular module 221 may identify and authenticate the electronic device 201 within a communication network using a subscriber identification module (for example, the SIM card 224). According to an embodiment, the cellular module 221 may perform at least some of the functions that the processor 210 may provide. According to an embodiment, the cellular module 221 may include a Communication Processor (CP).

For example, each of the Wi-Fi module 223, the BT module 225, the GPS module 227, and the NFC module 228 may include a processor for processing data transmitted/received through the corresponding module. According to some embodiments, at least some (for example, two or more) of the cellular module 221, the Wi-Fi module 223, the BT module 225, the GNSS module 227, and the NFC module 228 may be included in one Integrated Chip (IC) or IC package.

The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), an antenna, etc. According to another embodiment, at least one of the cellular module 221, the Wi-Fi module 223, the BT module 225, the GNSS module 227, and the NFC module 228 may transmit/receive an RF signal through a separate RF module.

The subscriber identification module 224 may include, for example, a card including a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 230 (e.g., the memory 130) may include, for example, an internal memory 232 or an external memory 234. The internal memory 232 may include, for example, at least one of a volatile memory (e.g., a Dynamic Random Access Memory (DRAM), a Static RAM (SRAM), a Synchronous Dynamic RAM (SDRAM), etc.) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory, a NOR flash memory, etc.), a hard disk drive, a Solid State Drive (SSD), etc.).

The external memory 234 may further include a flash drive, for example, a Compact Flash (CF), a Secure Digital (SD), a Micro-Secure Digital (Micro-SD), a Mini-Secure Digital (Mini-SD), an extreme Digital (xD), a Multi-Media Card (MMC), a memory stick, or the like. The external memory 234 may be functionally and/or physically connected to the electronic device 201 through various interfaces.

The sensor module 240 may include various sensors including sensor circuitry configured to, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H (e.g., a red, green, blue (RGB) sensor), a biometric sensor 240I, a temperature/humidity sensor 240J, an illumination (e.g., light) sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and/or a fingerprint sensor. The sensor module 240 may further include a control circuit for controlling one or more sensors included therein. In some embodiments, the electronic device 201 may further include a processor configured to control the sensor module 240 as a part of, or separately from, the processor 210 and may control the sensor module 240 while the processor 210 is in a sleep state.

The input device 250 may include various input circuitry, such as, for example, and without limitation, a touch panel 252, a (digital) pen sensor 254, a key 256, or an ultrasonic input unit 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user.

The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (e.g., a microphone 288) to identify data corresponding to the detected ultrasonic waves.

The display 260 (for example, the display 160) may include a panel 262, a hologram device 264 or a projector 266. The panel 262 may have a configuration that is the same as, or similar to, that of the display 160 illustrated in FIG. 1. The panel 262 may be implemented to be, for example, flexible, transparent, or wearable. The panel 262, together with the touch panel 252, may be implemented as one module. The hologram device 264 may show a three-dimensional image in the air using an interference of light. The projector 266 may display an image by projecting light onto a screen. The screen may be located, for example, in the interior of, or on the exterior of, the electronic device 201. According to one embodiment, the display 260 may further include a control circuit for controlling the panel 262, the hologram device 264, or the projector 266.

The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included, for example, in the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may, for example, convert a sound into an electrical signal, and vice versa. At least some elements of the audio module 280 may be included, for example, in the input/output interface 150 illustrated in FIG. 1. The audio module 280 may process sound information that is input or output through, for example, a speaker 282, a receiver 284, earphones 286, the microphone 288, etc.

The camera module 291 is a device which may photograph a still image and a dynamic image. According to an embodiment, the camera module 291 may include one or more image sensors (for example, a front sensor or a back sensor), a lens, an Image Signal Processor (ISP) or a flash (for example, LED or xenon lamp).

The power management module 295 may manage, for example, the power of the electronic device 201. According to an embodiment, the power management module 295 may include a Power Management Integrated Circuit (PMIC), a charger Integrated Circuit (IC), or a battery or fuel gauge. The PMIC may have a wired and/or wireless charging method. Examples of the wireless charging method may include a magnetic resonance method, a magnetic induction method, an electromagnetic wave method, etc. Additional circuits (e.g., a coil loop, a resonance circuit, a rectifier, etc.) for wireless charging may be further included. The battery gauge may measure, for example, the residual amount of the battery 296 and a voltage, current, or temperature while charging. The battery 296 may include, for example, a rechargeable battery and/or a solar battery.

The indicator 297 may display a particular state, for example, a booting state, a message state, a charging state, or the like of the electronic device 201 or a part (for example, the processor 210) of the electronic device 201. The motor 298 may convert an electrical signal into a mechanical vibration and may generate a vibration, a haptic effect, etc. Although not illustrated, the electronic device 201 may include a processing unit (e.g., a GPU) for supporting mobile TV. The processing unit for supporting mobile TV may, for example, process media data according to a certain standard such as Digital Multimedia Broadcasting (DMB), Digital Video Broadcasting (DVB), or mediaFLO™.

Figure 3:
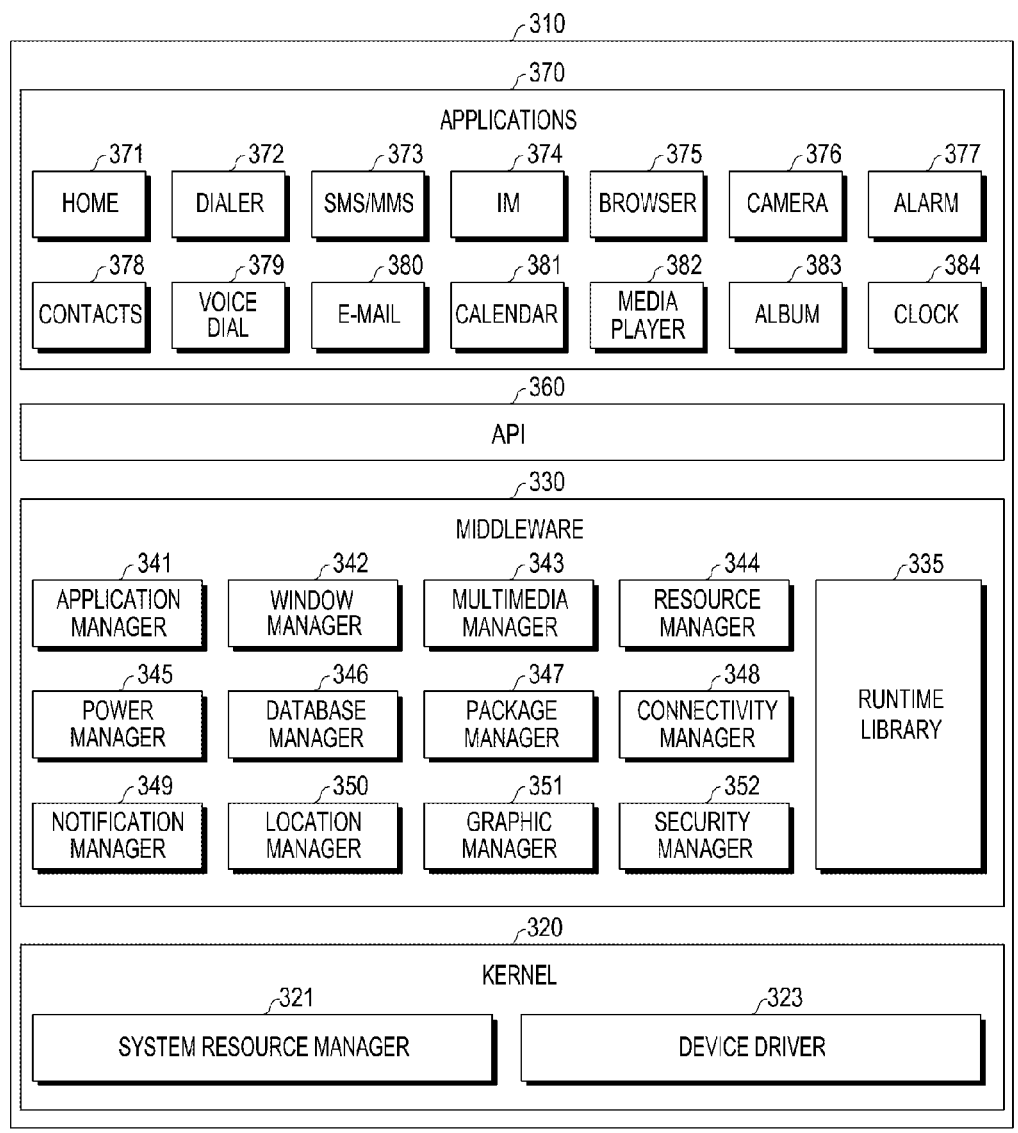
FIG. 3 is a block diagram illustrating an example program module according to various example embodiments of the present disclosure.

FIG. 3 is a block diagram illustrating an example program module according to various example embodiments of the present disclosure. According to an example embodiment, the program module 310 (e.g., the program 140) may include an Operating System (OS) that controls resources relating to an electronic device (e.g., the electronic device 101) and/or various applications (e.g., the application programs 147) that are executed in the operating system. The operating system may be, for example, Android, iOS, Windows, Symbian, Tizen, Bada, etc.

The program module 310 may include a kernel 320, middleware 330, an Application Programming Interface (API) 360, and/or applications 370. At least a part of the program module 310 may be preloaded on the electronic device, or may be downloaded from an external electronic device (e.g., the electronic device 102 or 104 or the server 106).

The kernel 320 (e.g., the kernel 141) may include, for example, a system resource manager 321 and/or a device driver 323. The system resource manager 321 may control, allocate, or retrieve system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver.

The middleware 330 may provide a function required by the applications 370 in common, or may provide various functions to the applications 370 through the API 360 such that the applications 370 can efficiently use limited system resources within the electronic device. According to an example embodiment, the middleware 330 (e.g., the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may perform input/output management, memory management, the functionality for an arithmetic function, etc.

The application manager 341 may manage, for example, the life cycle of at least one of the applications 370. The window manager 342 may manage Graphical User Interface (GUI) resources used on a screen. The multimedia manager 343 may determine a format required to reproduce various media files, and may encode or decode a media file by using a coder/decoder (codec) appropriate for the corresponding format. The resource manager 344 may manage resources, such as the source code, the memory, the storage space, and the like of at least one of the applications 370.

The power manager 345 may operate together with, for example, a Basic Input/Output System (BIOS) to manage a battery or power and provide power information required for the operation of the electronic device. The database manager 346 may generate, search, and/or change a database to be used by at least one of the applications 370. The package manager 347 may manage the installation or update of an application that is distributed in the form of a package file.

The connectivity manager 348 may manage a wireless connection, such as Wi-Fi, Bluetooth, etc. The notification manager 349 may display or notify of an event, such as an arrival message, an appointment, a proximity notification, etc., in such a manner as not to disturb a user. The location manager 350 may manage location information of the electronic device. The graphic manager 351 may manage a graphic effect to be provided to a user and a user interface relating to the graphic effect. The security manager 352 may provide various security functions required for system security, user authentication, etc. According to an embodiment, in a case where the electronic device (e.g., the electronic device 101) has a telephone call function, the middleware 330 may further include a telephony manager for managing a voice or video call function of the electronic device.

The middleware 330 may include a middleware module that forms a combination of various functions of the above-described elements. The middleware 330 may provide specialized modules according to the types of operating systems in order to provide differentiated functions. Furthermore, the middleware 330 may dynamically remove some of the existing elements, or may add new elements.

The API 360 (e.g., the API 145) is, for example, a set of API programming functions, and may be provided with different configurations according to operating systems. For example, in the case of Android or iOS, one API set may be provided for each platform, and in the case of Tizen, two or more API sets may be provided for each platform.

The applications 370 (e.g., the application programs 147) may include one or more applications that can perform functions, for example, home 371, dialer 372, SMS/MMS 373, Instant Message (IM) 374, browser 375, camera 376, alarm 377, contacts 378, voice dial 379, e-mail 380, calendar 381, media player 382, album 383, clock 384, health care (e.g., measuring exercise quantity or blood sugar), and environment information (e.g., atmospheric pressure, humidity, temperature information, etc.).

According to an embodiment, the applications 370 may include an application (hereinafter, referred to as an "information exchange application" for convenience of description) that supports information exchange between the electronic device (e.g., the electronic device 101) and an external electronic device (e.g., the electronic device 102 or 104). The information exchange application may include, for example, a notification relay application for transferring specific information to an external electronic device or a device management application for managing an external electronic device.

For example, the notification relay application may include a function of delivering, to the external electronic device (for example, the electronic device 103 or 104), notification information generated by other applications (for example, an SMS/MMS application, an email application, a health care application, an environmental information application, and the like) of the electronic device 101. Furthermore, the notification relay application may, for example, receive notification information from the external electronic device and may provide the received notification information to a user.

The device management application may manage (e.g., install, delete, or update), for example, at least one function of an external electronic device (e.g., the electronic device 102 or 104) that communicates with the electronic device (e.g., a function of turning on/off the external electronic device itself (or some components thereof) or a function of adjusting the brightness (or resolution) of a display), applications that operate in the external electronic device, or services (e.g., a call service, a message service, etc.) that are provided by the external electronic device.

According to an embodiment, the applications 370 may include applications (e.g., a health care application of a mobile medical appliance, etc.) that are specified according to attributes of an external electronic device (e.g., the electronic device 102 or 104). According to an embodiment, the applications 370 may include applications that are received from an external electronic device (e.g., the server 106, or the electronic device 102 or 104). According to an embodiment, the applications 370 may include preloaded applications or third-party applications that can be downloaded from a server. Names of the elements of the program module 310, according to the above-described embodiments of the present disclosure, may change depending on the type of OS.

According to various exemplary embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

Each of the components of the electronic device according to the present disclosure may be implemented by one or more components and the name of the corresponding component may vary depending on a type of the electronic device. In various embodiments, the inspection apparatus may include at least one of the above-described elements. Some of the above-described elements may be omitted from the electronic device, or the inspection apparatus may further include additional elements. Further, some of the components of the electronic device according to the various embodiments of the present disclosure may be combined to form a single entity, and thus, may equivalently execute functions of the corresponding elements prior to the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of various circuitry, an Application-Specific Integrated Circuit (ASIC) chip, a Field-Programmable Gate Arrays (FPGA), processor (e.g., including processing circuitry, such as, for example, a CPU) and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors (including processing circuitry) to execute the function corresponding to the instruction. The computer-readable storage medium may, for example, be the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

Figure 4:
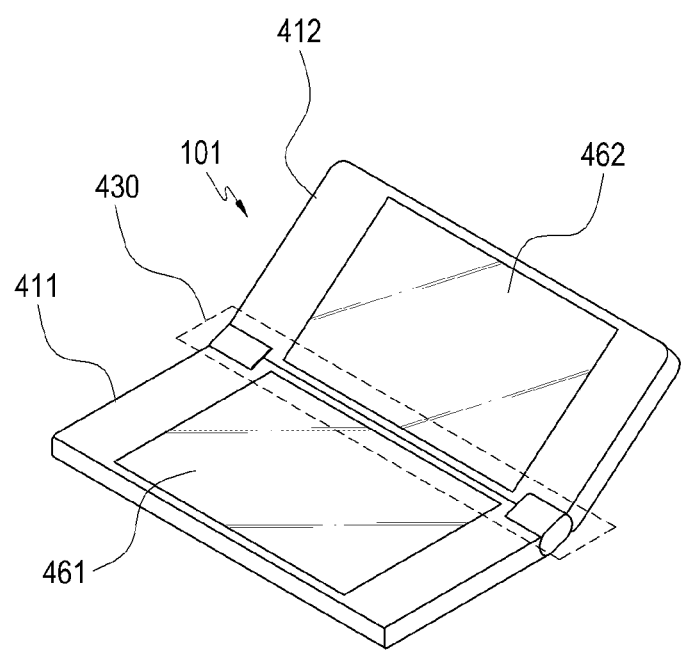
FIG. 4 is a diagram illustrating an example electronic device having multiple displays provided therein according to various example embodiments of the present disclosure.

FIG. 4 is a diagram illustrating an example electronic device having multiple displays provided therein according to various example embodiments.

Referring to FIG. 4, the electronic device 101 may include multiple displays, for example, a first display 461 and a second display 462. The first display 461 and second display 462 may include a touch screen. Accordingly, the electronic device 101 may receive a touch, a gesture, proximity, or hovering input using an electronic pen or the user's body part, with respect to at least one of the first display 461 and the second display 462. The first display 461 may be included in the first body 411, and the second display 462 may be included in the second body 412. The first body 411 having the first display 461 may be rotatably connected to the second body 412 having the second display 462. For example, the first body 411 and second body 412 may be rotatably connected each other through the connection unit 430. In an embodiment, the connection unit 430 may include a hinge so as to enable the first body 411 and the second body 412 to be rotatably connected to each other. In another embodiment, the connection unit 430 may include a flexible or stretchable member so as to enable the first body 411 and the second body 412 to be rotatably connected to each other.

Accordingly, the first body 411 and second body 412 may be rotated such that the first display 461 and the second display 462 face each other. In addition, the first body 411 and second body 412 may also be rotated such that the first display 461 and the second display 462 face opposite directions to each other.

Figure 5:
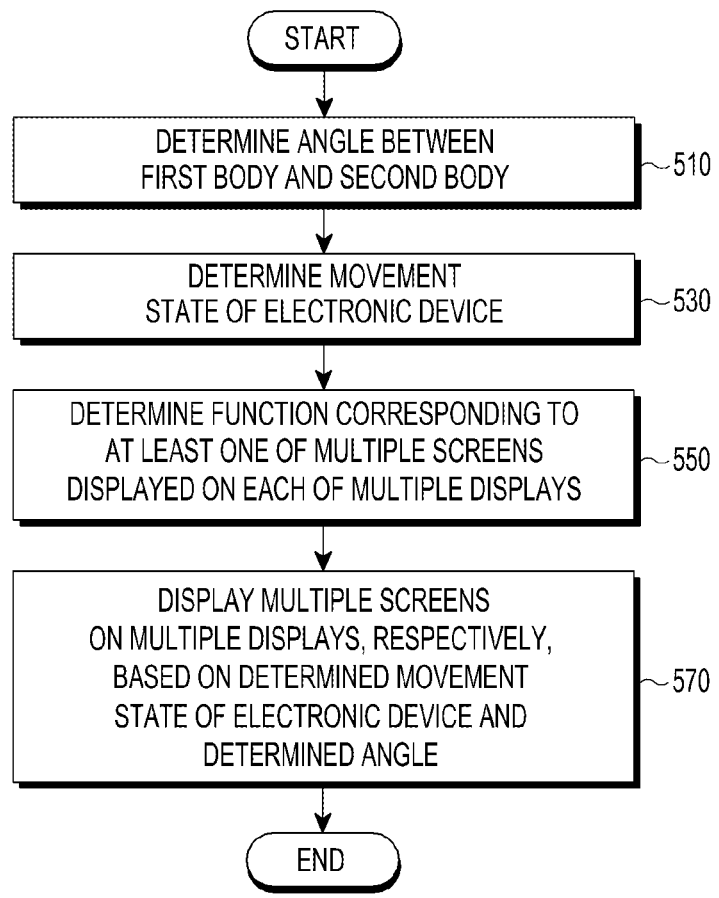
FIG. 5 is a flowchart illustrating an example method of operating an electronic device according to various example embodiments of the present disclosure.

FIG. 5 is a flowchart illustrating an example operation method for an electronic device according to various example embodiments of the present disclosure.

In operation 510, the electronic device 101, for example, the processor 120 may determine an angle between the first body 411 and second body 412.

The processor 120 may determine the angle between the first body 411 and second body 412, on the basis of a sensing value for the angle between the first body 411 and the second body 412, which is sensed by the sensor module 240.

This will be described in greater detail below with reference to FIG. 6.

Figure 6:
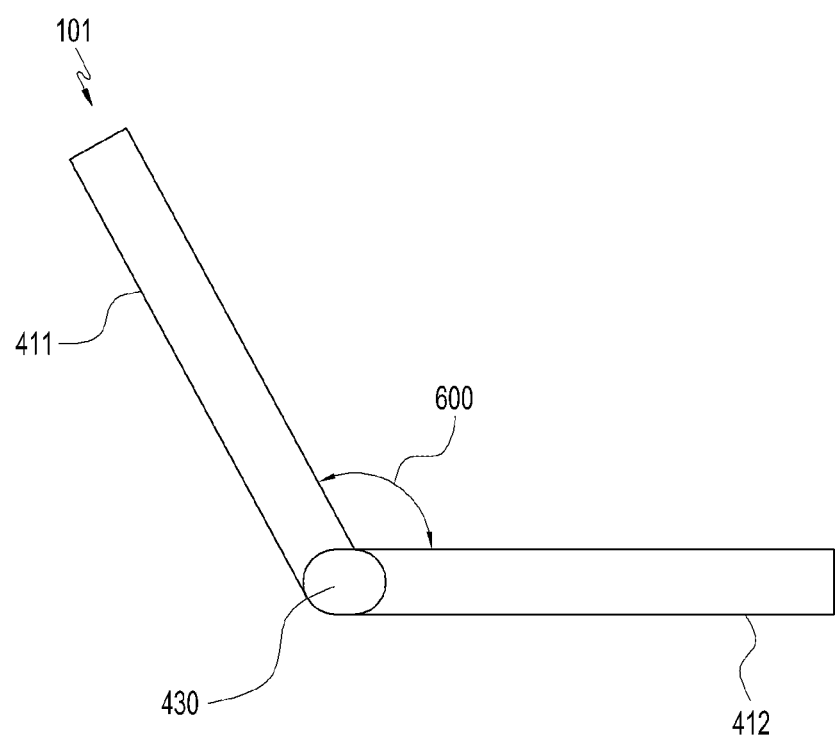
FIG. 6 is a diagram illustrating an example angle between a first body and a second body according to various example embodiments of the present disclosure.

FIG. 6 is a diagram illustrating an example of an angle between a first body and a second body according to various example embodiments of the present disclosure.

Referring to FIG. 6, the first body 411 and second body 412 of the electronic device 101 may be rotated to each other. Therefore, the first body 411 and second body 412 may be rotated so as to be located with a certain angle between each other. As described above, the connection unit 430 may connect the first body 411 and the second body 412 such that the first body 411 and the second body 412 are rotated to each other. An angle 600 between the first body 411 and second body 412 may be formed while the first body 411 and the second body 412 are being rotated. An angle sensor (not shown) included in the sensor module 240 may sense a value of the angle between the first body 411 and the second body 412. For example, the angle sensor may be included in the connection unit 430. The processor 120 may determine the angle between the first body 411 and the second body 412 on the basis of the value of the angle sensed by the angle sensor included in the sensor module 240. In an embodiment, the processor 120 may determine whether the value of the angle between the first body 411 and the second body 412 is included within a predetermined range, for example, from a first angle value to a second angle value. Accordingly, the processor 120 may determine the angle between the first body 411 and second body 412.

Description will be made below again with reference to FIG. 5.

Referring to FIG. 5, in operation 530, the electronic device 101, for example, the processor 120 may determine the movement state of the electronic device 101.

The processor 120 may determine the movement state of the electronic device 101 on the basis of a movement value related to the movement of the electronic device 101, which is sensed by the sensor module 240. For example, at least one of the gyro sensor 240B and acceleration sensor 240E included in the sensor module 240 may sense the movement value related to the movement of the electronic device 101. The processor 120 may determine the movement state of the electronic device 101 on the basis of the movement value sensed by at least one of the gyro sensor 240B and acceleration sensor 240E included in the sensor module 240.

In an embodiment, the processor 120 may determine whether the electronic device 101 does not move for a predetermined period of time on the basis of the movement value related to the movement of the electronic device 101, which is sensed by the sensor module 240.

When it is determined that the electronic device 101 does not move for a predetermined period of time, the electronic device 101, for example, the processor 120 may determine that the electronic device 101 is in the mounted state. For example, when the movement value equal to or greater than a predetermined value, which is associated with the electronic device 101, is not sensed for a predetermined period of time, the processor 120 may determine that the electronic device 101 did not move. For example, the mounted state may refer to a state where the electronic device 101 is supported on a support surface. For example, the mounted state may refer to a state where the electronic device 101 is supported on a desk, a table, and the like. For another example, when it is determined that the electronic device 101 has been moved within a predetermined time, the processor 120 may determine the movement state of the electronic device 101 as a portable state. For example, when the movement value equal to or greater than a predetermined value, which is associated with the electronic device 101, is sensed for a predetermined period of time, the processor 120 may determine that the electronic device 101 has been moved. Here, the portable state may refer to a state where the electronic device 101 is not supported on a particular surface. For example, the portable state may refer to a state where the user of the electronic device 101 holds the electronic device 101.

According to various embodiments of the present disclosure, the electronic device 101 may determine the movement state of the electronic device 101 based on various values related to the electronic device 101 in addition to the movement value as described above. For example, the electronic device 101 may determine the movement state of the electronic device 101 based on whether the electronic device 101 is in a horizontal state. In addition, the electronic device 101 may determine the movement state of the electronic device 101 based on the movement value of the electronic device 101 and the horizontal state of the electronic device 101. In addition, the electronic device 101 may further include the angle between the first body 411 and the second body 412 as well as one or more of the movement value and the horizontal state as described above, so as to determine the movement state of the electronic device 101.

This will be described in greater detail below with reference to FIGS. 7 and 8.

Figure 7:
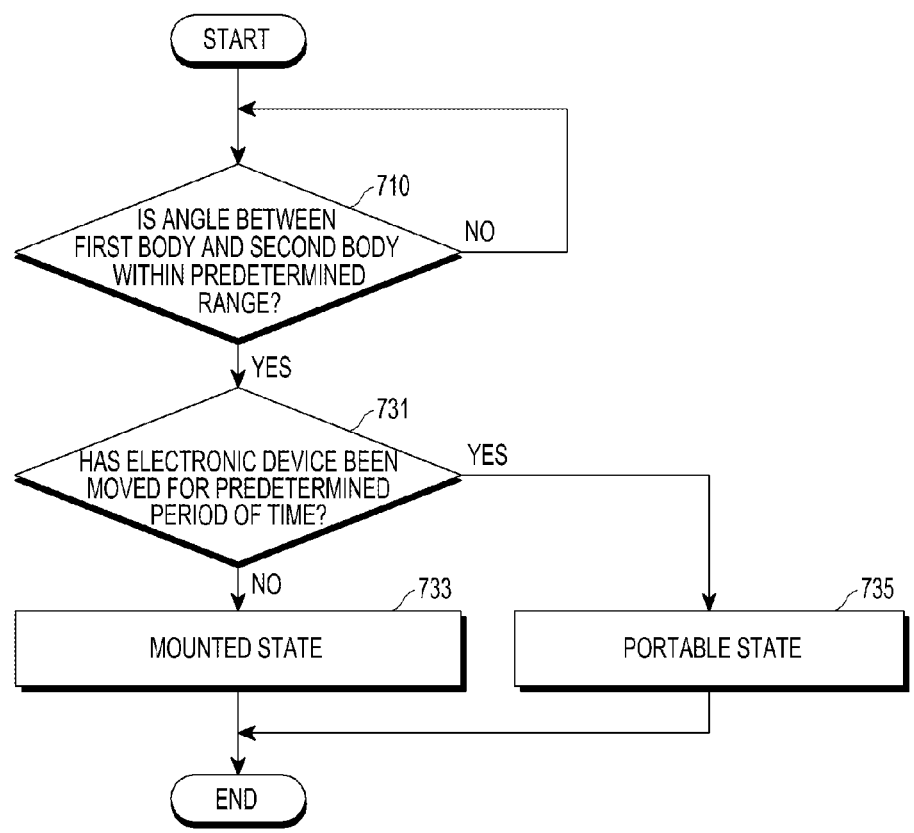
FIG. 7 is a flowchart illustrating example operations of determining of a movement state of an electronic device according to various example embodiments of the present disclosure.

FIG. 7 is a flowchart illustrating example operations of determining of a movement state of an electronic device according to various example embodiments of the present disclosure.

Referring to FIG. 7, in operation 710, the electronic device 101, for example, the processor 120 may determine whether the angle between the first body 411 and second body 412 is within a predetermined range. Since the operation for determining, by the electronic device 101, the angle between the body 411 and the second body 412 is already described in the above, the detailed description thereof will be omitted. When the angle between the first body 411 and the second body 412 is within a predetermined range, the electronic device 101 may determine whether the electronic device 101 has been moved for a predetermined period of time. In operation 731, the electronic device 101, for example, the processor 120 may determine whether the electronic device 101 has been moved for a predetermined period of time. Since the operation for determining of the movement of the electronic device 101 has been already described in the above, the detailed description thereof will be omitted. In operation 733, when it is determined that the electronic device 101 does not move for a predetermined period of time, the electronic device 101, for example, the processor 120 may determine that the electronic device 101 is in the mounted state. In operation 735, when it is determined that the electronic device 101 has been moved for a predetermined period of time, the electronic device 101, for example, the processor 120 may determine that the electronic device 101 is in the portable state. As described above, the electronic device 101 may determine the movement state of the electronic device 101, based on the determined angle between the first body 411 and second body 412 and whether the electronic device 101 moves or not.

Figure 8:
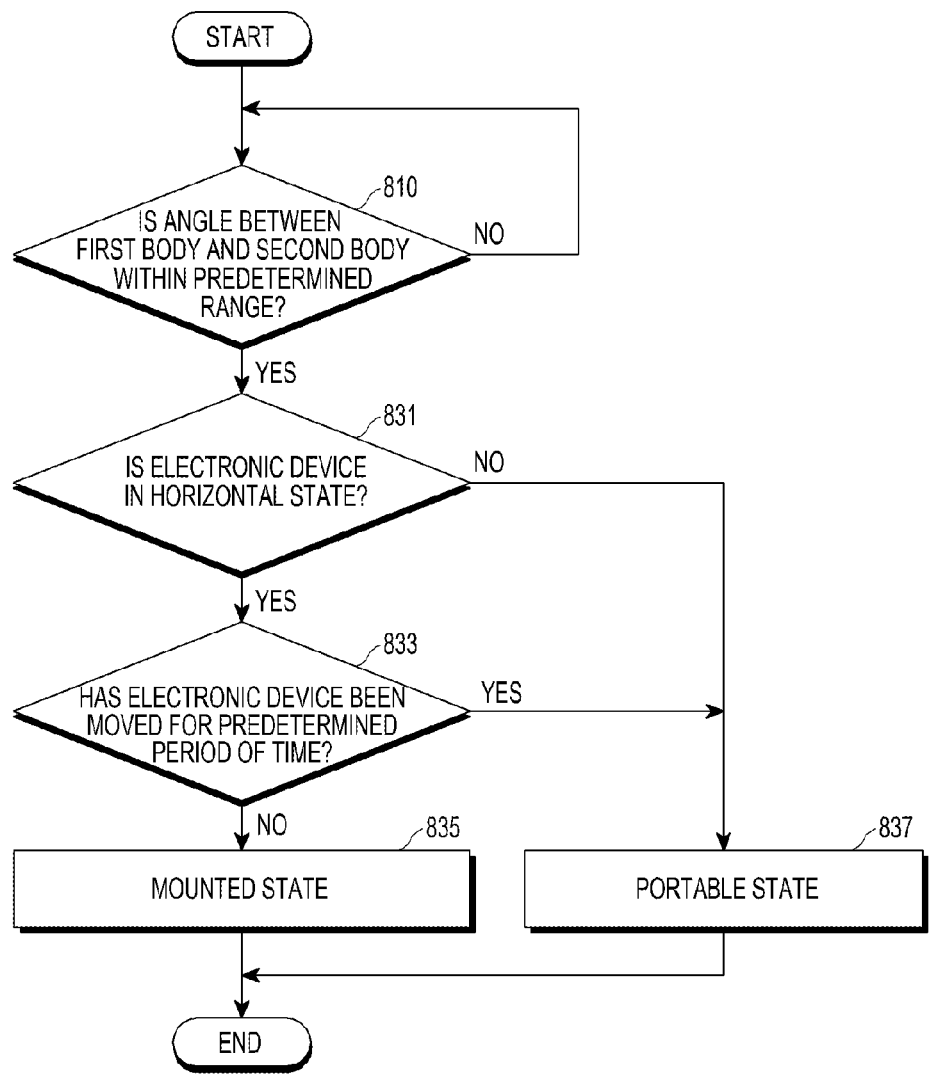
FIG. 8 is a flowchart illustrating example operations of determining of a movement state of an electronic device according to various example embodiments of the present disclosure.

FIG. 8 is a flowchart illustrating example operations of determining of a movement state of an electronic device according to various example embodiments of the present disclosure.

Referring to FIG. 8, in operation 810, the electronic device 101, for example, the processor 120 may determine whether the angle between the first body 411 and second body 412 is within a predetermined range. Since the operation for determining, by the electronic device 101, the angle between the body 411 and the second body 412 is already described in the above, the detailed description thereof will be omitted. When the angle between the first body 411 and the second body 412 is within a predetermined range, the electronic device 101 may determine whether the electronic device 101 has been moved for a predetermined period of time. In operation 831, the electronic device 101, for example, the processor 120 may determine whether the electronic device 101 is in a horizontal state. In an embodiment, the sensor module 240, for example, the gyro sensor 240B may sense a horizontal value of the electronic device 101. Here, the horizontal value may refer to a value with respect to the direction where the electronic device 101 is perpendicular to the terrestrial-gravity direction. When the horizontal value of the electronic device 101 is within a predetermined range, the electronic device 101, for example, the processor 120 may determine that the electronic device 101 is in the horizontal state. In operation 833, when it is determined that the electronic device 101 is in the horizontal state, the electronic device 101, for example, the processor 120 may determine whether the electronic device 101 has been moved for a predetermined period of time. Since the operation for determining of the movement of the electronic device 101 has been already described in the above, the detailed description thereof will be omitted. In operation 835, when it is determined that the electronic device 101 does not move for a predetermined period of time, the electronic device 101, for example, the processor 120 may determine that the electronic device 101 is in the mounted state. In operation 837, when it is determined that the electronic device 101 has been moved for a predetermined period of time, the electronic device 101, for example, the processor 120 may determine that the electronic device 101 is in the portable state. As described above, the electronic device 101 may determine the movement state of the electronic device 101 based on the determined angle between the first body 411 and second body 412, the horizontal state of the electronic device 101, and whether the electronic device 101 moves or not.

Description will be made below again with reference to FIG. 5.

In operation 550, the electronic device 101, for example, the processor 120 may determine a function corresponding to at least one of multiple screens displayed on each of multiple displays included in the electronic device 101.

For example, the processor 120 may determine a function corresponding to at least one of the first display 461 of the first body 411 and the second display 462 of the second body 412 of the electronic device 101.

In an embodiment, the processor 120 may determine whether a function corresponding to at least one of the first screen displayed on the first display 461 and the second screen displayed on the second display 462 is one of an input function, a selection function, and a control function.

For example, the input function may represent a function for inputting a particular character. For example, a screen corresponding to the input function may be a screen including at least one character input area.

The selection function may represent a function for selecting at least one object among multiple objects. For example, a screen corresponding to the selection function may be a menu screen for selecting at least one object among objects corresponding to the plurality of functions, respectively. For another example, a screen corresponding to the selection function may be a menu screen for selecting at least one object among objects corresponding to the plurality of contents, respectively.

The control function may represent a function for selecting at least one function among multiple functions. For example, a screen corresponding to the control function may be a control screen for controlling reproduction of contents. For another example, a screen corresponding to the control function may be a configuration screen for setting at least one of the plurality of set values.

The description of the function of the electronic device 101 as described above is an example for illustration, and is not limited thereto. Therefore, the electronic device 101 may determine various functions corresponding to a screen displayed on at least one of the multiple displays.

In operation 570, the electronic device 101, for example, the processor 120 may display multiple screens on the multiple displays, respectively, on the basis of the determined movement state of the electronic device and the determined angle.

In an embodiment, when the determined movement state of the electronic device 101 is in the portable state and the determined angle is within a predetermined range, the electronic device 101, for example, the processor 120 may display the first screen on the first display 461 and display the second screen on the second display 462. In addition, when the determined movement state of the electronic device 101 is in the mounted state and the determined angle is within a predetermined range, the processor 120 may display a third screen on the first display 461 and display a fourth screen on the second display 462. Here, the first screen and the third screen may be the same screen, and the second screen and the fourth screen may be screens for displaying different user interfaces corresponding to the same function. For example, the second screen may be a screen for displaying a first user interface associated with a first function, and the fourth screen may be a screen for displaying a second user interface associated with the first function. In addition, the first user interface may be a user interface that displays an entire function associated with the first function, and the second user interface may be a user interface that displays some functions associated with the first function.

In another embodiment, when the determined angle is not within a predetermined range, and the movement state of the electronic device 101 is in the portable state, the electronic device 101, for example, the processor 120 may display the first screen on the first display 461 and display the second screen on the second display 462, and when the movement state of the electronic device 101 is in the mounted state, the processor 120 may display the first screen on the first display 461 and display the second screen on the second display 462.

The electronic device 101 according to various embodiments of the present disclosure may display, on multiple displays, multiple screens corresponding to the determined function, respectively, on the basis of the determined movement state of the electronic device and the determined angle.

This will be described in greater detail below with reference to FIGS. 9 and 14.

Figure 9:
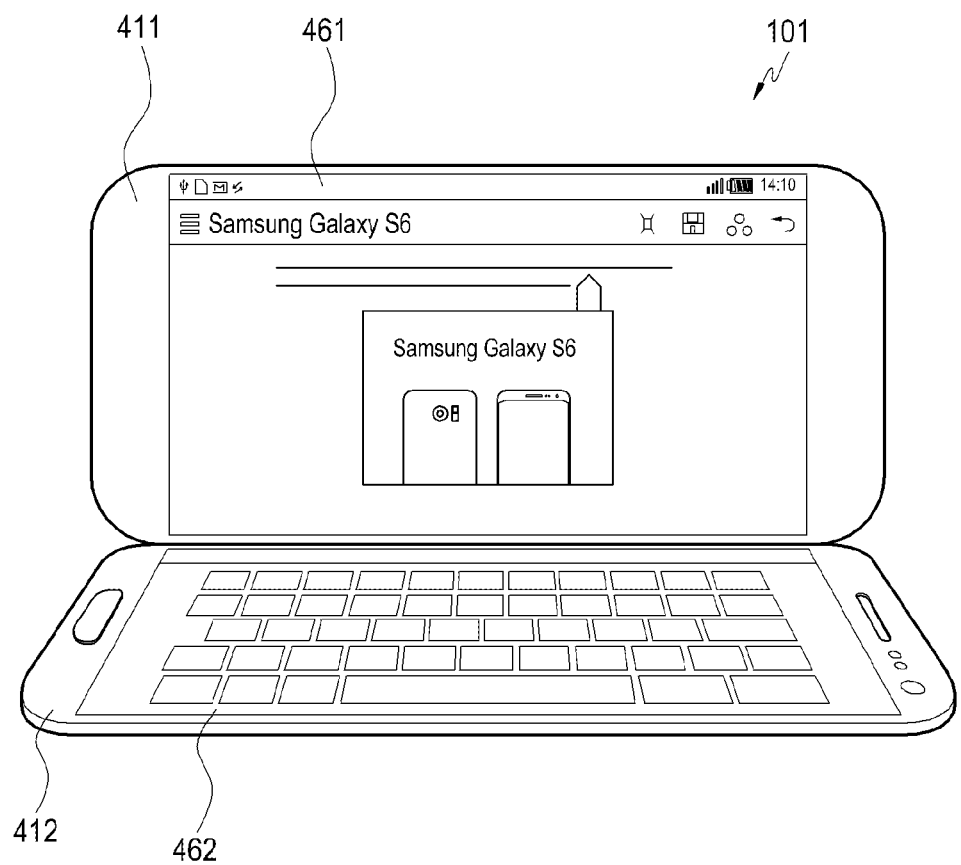
FIG. 9 is a diagram illustrating an example screen display related to an input function for a mounted state according to various example embodiments of the present disclosure.

FIG. 9 is a diagram illustrating an example screen display related to an input function for a mounted state according to various example embodiments of the present disclosure.

When an angle between a first body 411 and a second body 412 is within a predetermined range, the movement state of the electronic device 101 is in the mounted state, and the determined function corresponds to the input function, the electronic device 101, for example, the processor 120 may display, on a first display 461, a first screen for displaying a result of the input, and may display, on a second display 462, a second screen for displaying the input user interface. For example, the user input interface may include various user interfaces associated with the input, and may include, for example, a virtual keyboard.

Referring to FIG. 9, the electronic device 101 may display a screen including at least one input area on the first display 461 of the first body 411, and may display a virtual keyboard corresponding to a QWERTY keyboard on the second display 462 on the second body 412. As described above, the electronic device 101 according to various embodiments of the present disclosure may display, on at least one of the multiple displays, a full-size keyboard interface in a screen related to the input function of the mounted state.

Figure 10:
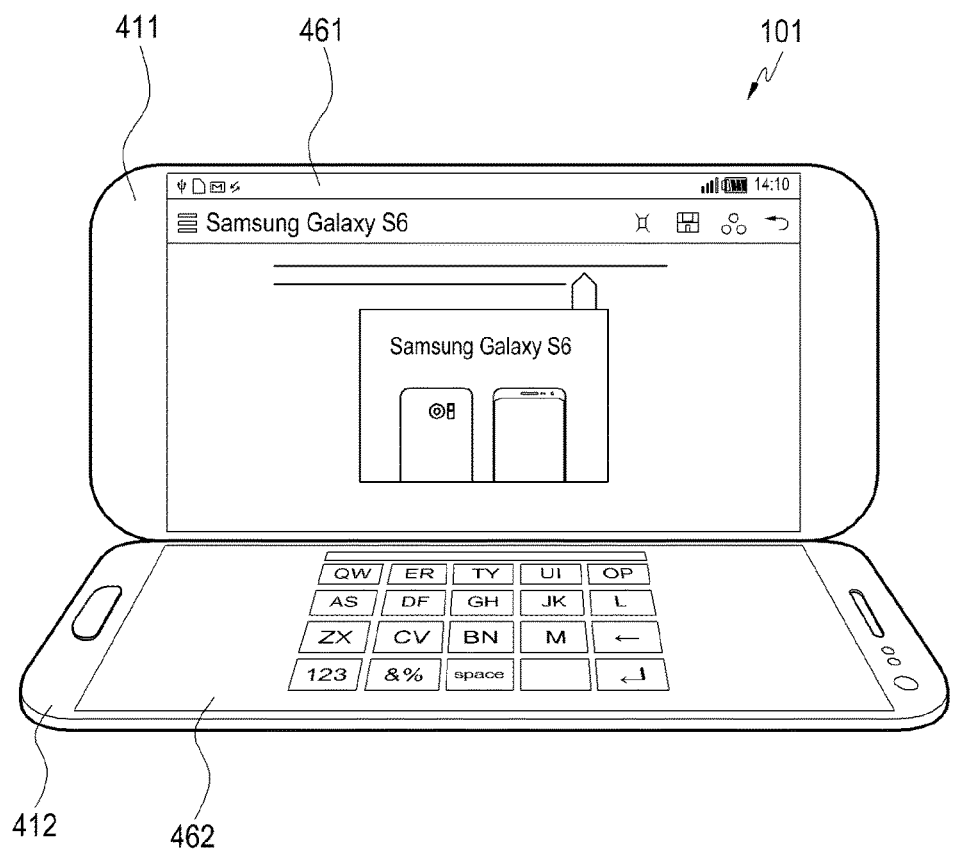
FIG. 10 is a diagram illustrating an example screen display related to an input function for a portable state according to various example embodiments of the present disclosure.

FIG. 10 is a diagram illustrating an example screen display related to an input function for a portable state according to various example embodiments of the present disclosure.

When an angle between a first body 411 and a second body 412 is within a predetermined range, the movement state of the electronic device 101 is in the portable state, and the determined function corresponds to the input function, the electronic device 101, for example, the processor 120 may display, on a first display 461, a first screen for displaying a result of the input, and may display, on a second display 462, a third screen for displaying the input user interface. Here, the user input interface may include various user interfaces associated with the input, and may include, for example, a reduced shape of a virtual keyboard. The reduced shape of the virtual keyboard may mean a virtual reduced keyboard, and may be, for example, a keyboard having smaller number of input keys than a full-size keyboard. Accordingly, one key of the reduced shape of the virtual keyboard may correspond to a plurality of characters.

Referring to FIG. 10, the electronic device 101 may display a screen including at least one input area on the first display 461 of the first body 411, and may display the reduced shape of the virtual keyboard on the second display 462 of the second body 412. As described above, the electronic device 101 according to various embodiments of the present disclosure may display, on at least one of the multiple displays, a reduced keyboard interface in a screen related to the input function of the portable state.

Figure 11:
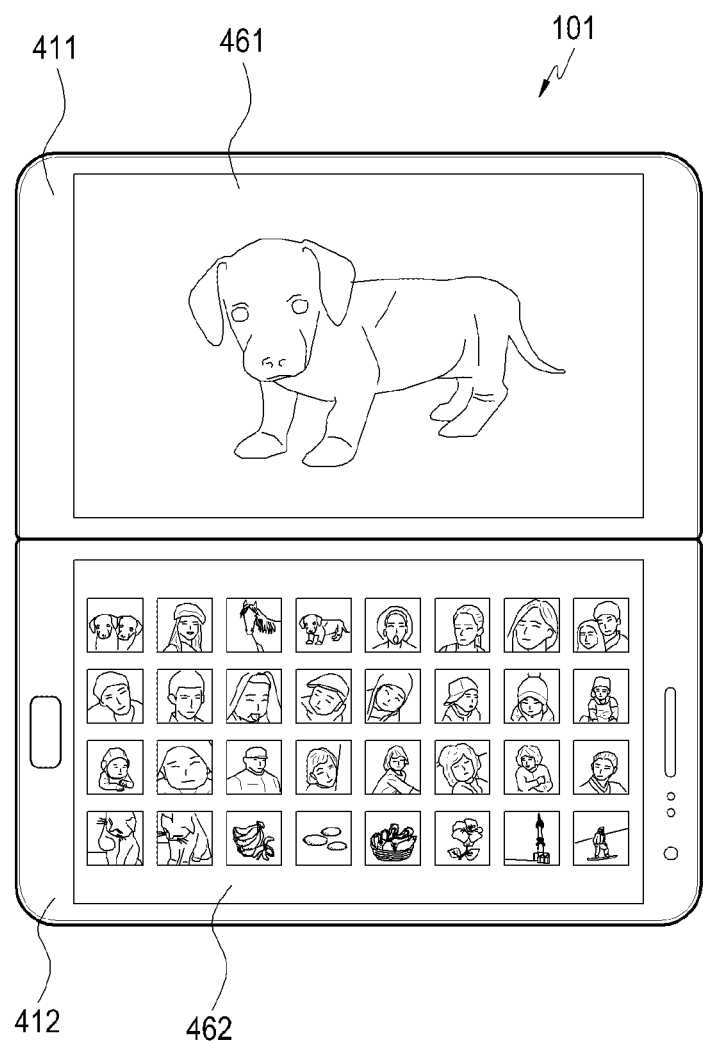
FIG. 11 is a diagram illustrating an example screen display related to a selection function for a mounted state according to various example embodiments of the present disclosure.

FIG. 11 is a diagram illustrating an example screen display related to a selection function for a mounted state according to various example embodiments of the present disclosure.

When an angle between a first body 411 and a second body 412 is within a predetermined range, the movement state of the electronic device 101 is in the mounted state, and the determined function corresponds to the selection function, the electronic device 101, for example, the processor 120 may display, on a first display 461, a fourth screen corresponding to the selected object, and may display, on a second display 462, a fifth screen corresponds to a selection screen for selecting multiple objects. Here, the multiple objects may be multiple icons and may be a thumbnail image for each of the multiple contents. In addition, in the selection function for the mounted state, the number of objects that is displayed on the fifth screen for selecting the multiple objects may be greater than the number of objects that is displayed on the sixth screen that is a selection screen for selecting multiple objects, in the selection function for the portable state which will be described later.

Referring to FIG. 11, the electronic device 101 may display, on the first display 461 of the first body 411, a screen corresponding to at least one selected object, and may display, on the second display 462 on the second body 412, multiple thumbnail images corresponding to the multiple objects. Here, the number of thumbnail images corresponding to the multiple objects displayed on the second display 462 may be greater than the number of thumbnail images to be displayed on the display according to the selection function for the portable state which will be described later. As described above, the electronic device 101 according to various embodiments may display multiple objects on at least one display of the multiple displays, in a screen associated with the selection function for the mounted state, and may display, on another display of the multiple displays, a screen corresponding to the selected at least one object.

Figure 12:
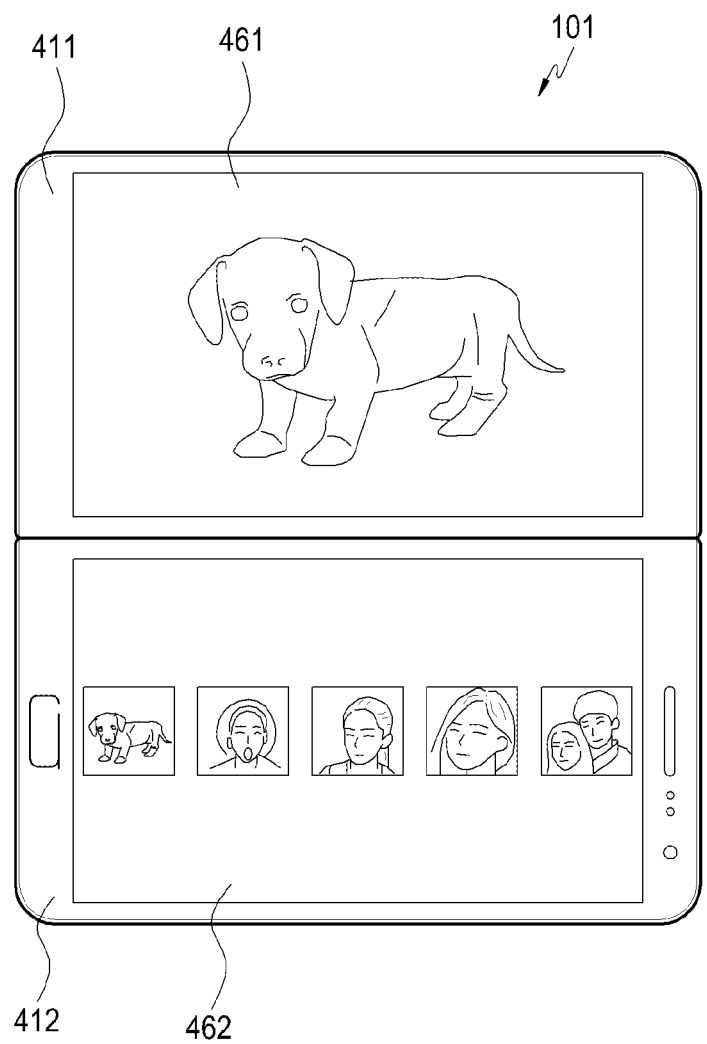
FIG. 12 is a diagram illustrating an example screen display related to a selection function for a portable state according to various example embodiments of the present disclosure.

FIG. 12 is a diagram illustrating an example screen display related to a selection function for a portable state according to various example embodiments of the present disclosure.

When an angle between a first body 411 and a second body 412 is within a predetermined range, the movement state of the electronic device 101 is in the mounted state, and the determined function corresponds to the selection function, the electronic device 101, for example, the processor 120 may display, on a first display 461, a fourth screen corresponding to the selected object, and may display, on a second display 462, a sixth screen that is a selection screen for selecting multiple objects. Here, the multiple objects may be multiple icons and may be a thumbnail image for each of the multiple contents. In addition, in the selection function for the portable state, the number of objects that is displayed on a sixth screen for selecting the multiple objects may be smaller than the number of objects that is displayed on a fifth screen for selecting multiple objects in the selection function for the portable state described above.

Referring to FIG. 12, the electronic device 101 may display, on the first display 461 of the first body 411, a screen corresponding to at least one selected object, and may display, on the second display 462 of the second body 412, multiple thumbnail images corresponding to the multiple objects. Here, the number of thumbnail images corresponding to the multiple objects displayed on the second display 462 may be smaller than the number of thumbnail images to be displayed on the display according to the selection function for the mounted state as described above. As described above, the electronic device 101 according to various embodiments may display multiple objects on at least one display of the multiple displays, in a screen associated with the selection function for the portable state, and may display, on another display of the multiple displays, a screen corresponding to the selected at least one object.

Figure 13:
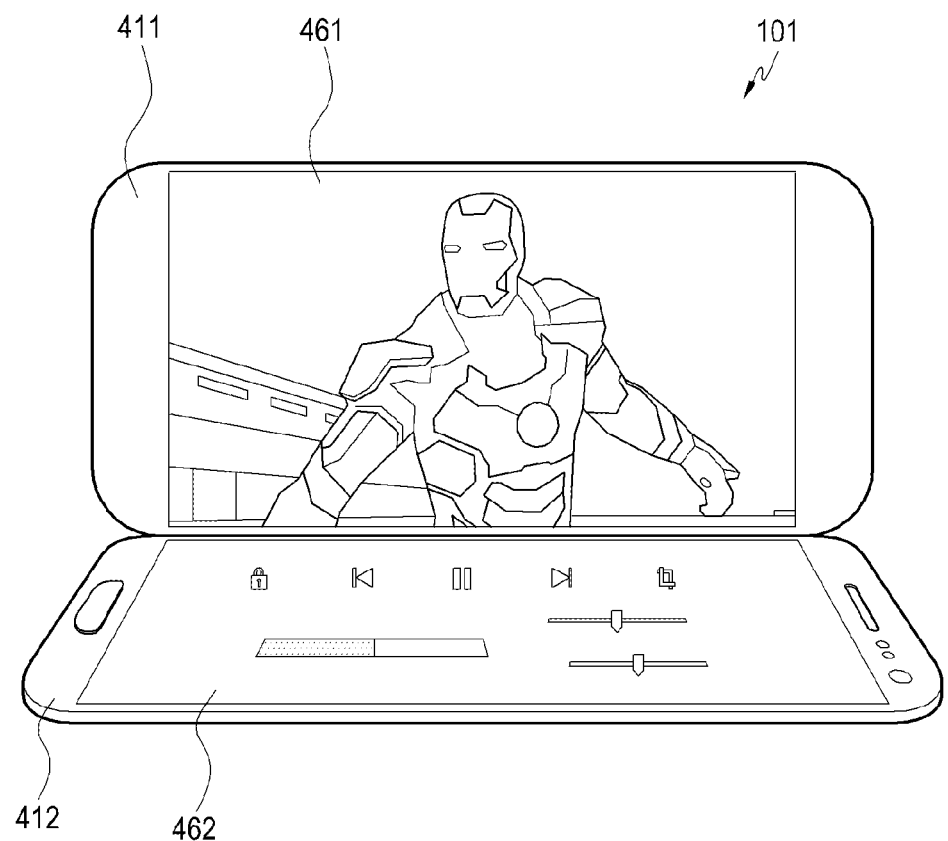
FIG. 13 is a diagram illustrating an example screen display related to a control function for a mounted state according to various example embodiments of the present disclosure.

FIG. 13 is a diagram illustrating an example screen display related to a control function for a mounted state according to various example embodiments of the present disclosure.

When an angle between a first body 411 and a second body 412 is within a predetermined range, the movement state of the electronic device 101 is in the mounted state, and the determined function corresponds to the control function, the electronic device 101, for example, the processor 120 may display, on a first display 461, a seventh screen corresponding to a target to be controlled, and may display, on a second display 462, an eighth screen for displaying a control user interface. Here, the control user interface may include various user interfaces associated with the control.

Referring to FIG. 13, the electronic device 101 may display, on the first display 461 of the first body 411, a screen representing contents corresponding to the target to be controlled, and may display, on the second display 462 of the second body 412, a first control user interface for controlling contents. Here, the first control user interface may include various menus for controlling contents, and may include more menu options than the number of second control user interfaces related to the control function of the portable state which will be described later. Accordingly, the electronic device 101 may display details of control menus on the second display 462. As described above, the electronic device 101 according to various embodiments of the present disclosure may display, on at least one of the multiple displays a user interface associated with the control, in a screen related to the control function of the mounted state.

Figure 14:
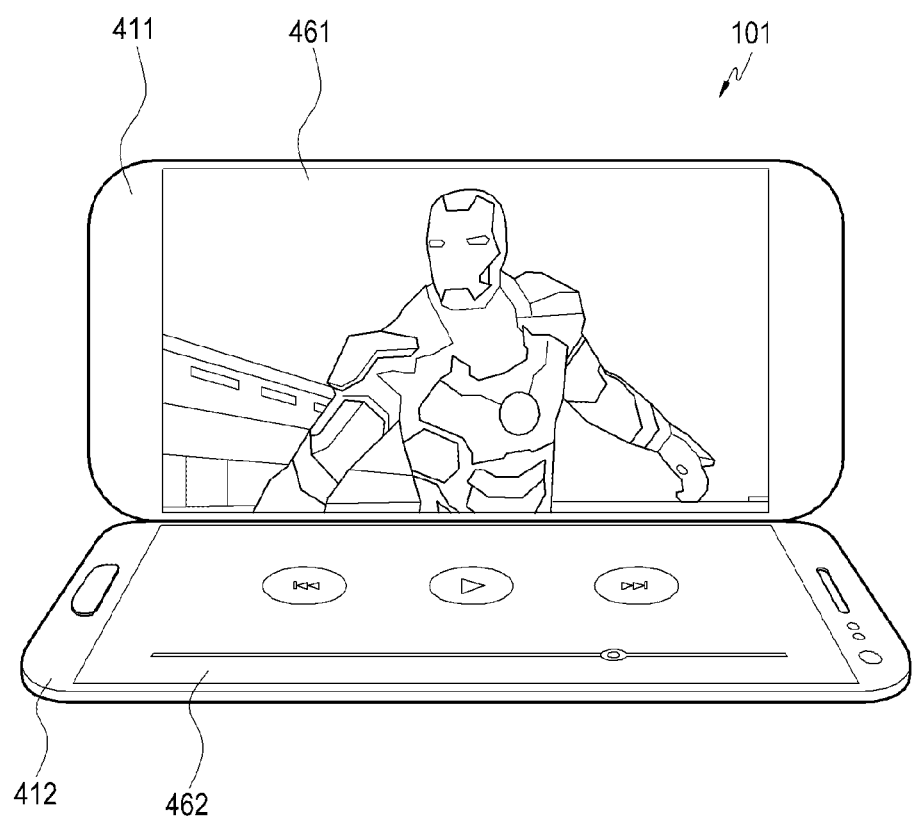
FIG. 14 is a diagram illustrating an example screen display related to a control function for a portable state according to various example embodiments of the present disclosure.

FIG. 14 is a diagram illustrating an example screen display related to a control function for a portable state according to various example embodiments of the present disclosure.

When an angle between a first body 411 and a second body 412 is within a predetermined range, the movement state of the electronic device 101 is in the portable state, and the determined function corresponds to the control function, the electronic device 101, for example, the processor 120 may display, on a first display 461, a seventh screen corresponding to a target to be controlled, and may display, on a second display 462, a ninth screen for displaying a control user interface. Here, the control user interface may include various user interfaces associated with the control.

Referring to FIG. 14, the electronic device 101 may display, on the first display 461 of the first body 411, a screen representing contents corresponding to the target to be controlled, and may display, on the second display 462 of the second body 412, a second control user interface for controlling contents. Here, the second control user interface may include various menus for controlling contents, and may include fewer menus options than the number of first control user interfaces related to the control function of the mounted state which will be described later. Accordingly, the electronic device 101 may display a simple control menu on the second display 462. As described above, the electronic device 101 according to various embodiments of the present disclosure may display, on at least one of the multiple displays, a user interface associated with the control in a screen related to the control function of the mounted state.

According to various example embodiments of the present disclosure, the electronic device 101, for example, the processor 120 may display at least one screen corresponding to the determined angle among multiple displays, on the basis of the determined movement state of the electronic device and the determined angle. For example, the processor 120 may adjust a screen displayed on at least one of the multiple displays according to the determined angle and display the same, on the basis of the determined movement state of the electronic device and the determined angle.

This will be described in greater detail below with reference to FIG. 15.

Figure 15:
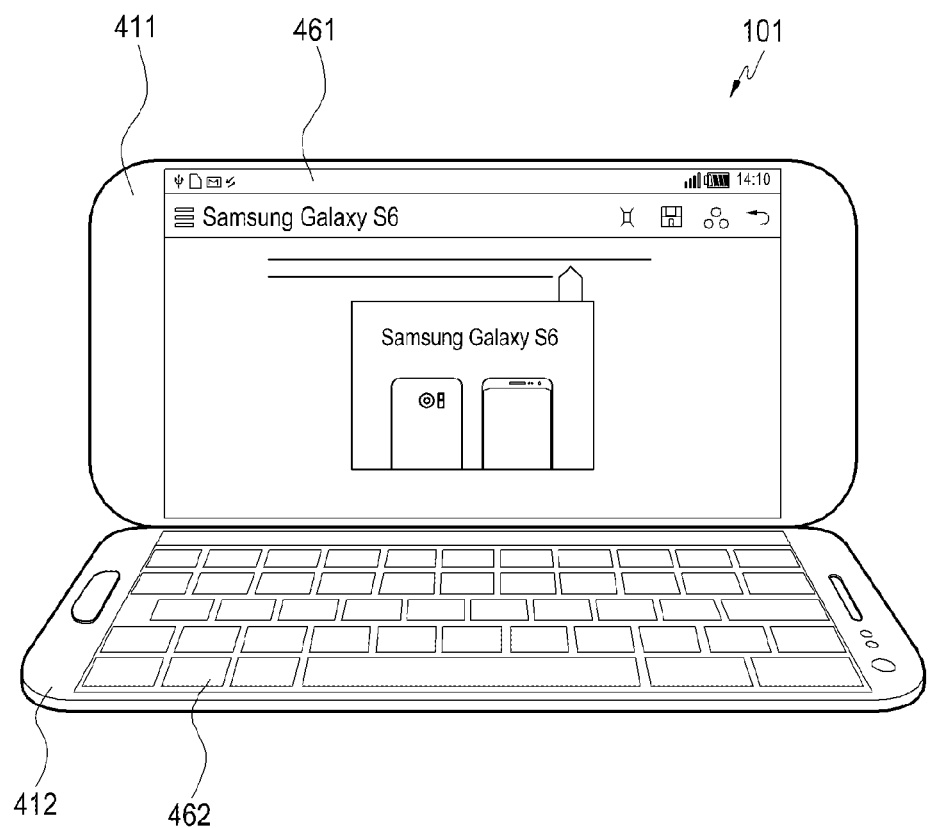
FIG. 15 is a diagram illustrating an example virtual keyboard in which the size of each key is adjusted based on a determined angle according to various example embodiments of the present disclosure.

FIG. 15 is a diagram illustrating an example virtual keyboard in which the size of a key is adjusted based on a determined angle according to various example embodiments of the present disclosure.

The electronic device 101, for example, the processor 120 may adjust at least one of the space between keys, the size of a key, and the width between keys of the virtual keyboard displayed on the second display 462, based on the angle between the first body 411 and second body 412, and may display the same.

Referring to FIG. 15, as the angle between the first body 411 and second body 412 becomes larger, the electronic device 101, for example, the processor 120 may increase, in the vertical direction, the size of one key of the virtual keyboard displayed on the second display 462, and may display the same. In addition, as the angle between the first body 411 and second body 412 becomes smaller, the electronic device 101, for example, the processor 120 may decrease the size of one key of the virtual keyboard displayed on the second display 462, in the vertical direction, and may display the same.

The description for the operation of adjusting the key size depending on the determined angle of the electronic device 101 and displaying the same according to various embodiments of the present disclosure corresponds to an example for illustration and is not limited thereto. Accordingly, the electronic device 101 according to various embodiments of the present disclosure may adjust various configurations, such as the space between keys and the width between keys, as well as the size of the key displayed on the display, depending on the determined angle, and may display the same.

As described above, the electronic device 101 according to various embodiments may adjust a screen that is displayed on at least one of multiple displays depending on the angle between the first body 411 and the second body 412, and may display the same.

The description of the electronic device can be applied to the electronic device having a single display. Therefore, when the electronic device having a single display can be modified to have multiple displays, multiple display areas, display multiple screens, or the like, the electronic device can also perform the operations described above.

In various example embodiments of the present disclosure, a method for operating an electronic device may include: determining an angle between a first body and a second body in an electronic device including the first and second body, the first body having a first display and the second body having a second display, which is rotatably connected to the first body; determining a movement state of the electronic device; and displaying a first screen on the first display and displaying a second screen on the second display based on the determined movement state of the electronic device and the determined angle.

In various example embodiments of the present disclosure, the determining of the movement state of the electronic device may include: determining whether the electronic device is in a portable state or in a mounted state based on the movement of the electronic device for a predetermined period of time.

In various example embodiments of the present disclosure, the method may further include determining a function corresponding to at least one of the first screen and the second screen.

In various example embodiments of the present disclosure, the displaying of the first screen on the first display and displaying of the second screen on the second display may include: when the electronic device is in the portable state, displaying, on the first screen, a first user interface related to the determined function; and when the electronic device in the mounted state, displaying, on the first screen, a second user interface related to the determined function.

In various example embodiments of the present disclosure, the first user interface displays an entire function related to the determined function, and the second user interface displays some functions related to the determined function.

In various example embodiments of the present disclosure, the displaying of the first screen on the first display and the displaying of the second screen on the second display may include: when the determined function corresponds to an input function, displaying, on the first screen, a result screen based on the input function, and displaying, on the second screen, an interface corresponding to the input function.

In various example embodiments of the present disclosure, the displaying of the first screen on the first display and the displaying of the second screen on the second display may include: when the determined function corresponds to a selection function, displaying, on the first screen, a selection screen for selecting one of multiple objects, and displaying, on the second screen, a screen corresponding to the selected object.

In various example embodiments of the present disclosure, the displaying of the first screen on the first display and displaying of the second screen on the second display may include: displaying a screen corresponding to the determined angle on at least one of the first screen and the second screen.

In various example embodiments of the present disclosure, the determining of the movement state of the electronic device may include: determining whether the electronic device is in a horizontal state.

In various example embodiments of the present disclosure, the determining of the angle between the first body and the second body may include: determining whether the angle between the first body and the second body is within a predetermined range.

In various example embodiments of the present disclosure, an electronic device may include: multiple displays including a first display and a second display; a first body including the first display; a second body including the second display, the second body being rotatably connected to the first body; a sensor module configured to sense a movement state of the electronic device; a memory; and a processor electrically connected to the memory, wherein the memory stores instructions which, when executed by the processor, cause the processor to perform operations including: determining an angle between the first body and the second body and the movement state of the electronic device based on a sensing value sensed by the sensor module; and displaying a first screen on the first display and displaying a second screen on the second display based on the determined movement state of the electronic device and the determined angle.

In various example embodiments of the present disclosure, the memory stores instructions which, when executed by the processor, cause the processor to perform an operation of: determining whether the electronic device is in a portable state or in a mounted state based on the movement of the electronic device for a predetermined period of time.

In various example embodiments of the present disclosure, wherein the memory stores instructions which, when executed by the processor, cause the processor to perform an operation of: determining a function corresponding to at least one of the first screen and the second screen.

In various example embodiments of the present disclosure, the memory stores instructions which, when executed by the processor, cause the processor to perform operations including: displaying, on the first screen, a first user interface related to the determined function when the electronic device is in the portable state; and displaying, on the second screen, a second user interface related to the determined function when the electronic device is in the mounted state.

In various example embodiments of the present disclosure, the memory stores instructions which, when executed by the processor, cause the processor to perform operations including: displaying an entire function related to the determined function through the first user interface; and displaying some functions related to the determined function through the second user interface.

In various example embodiments of the present disclosure, the memory stores instructions which, when executed by the processor, cause the processor to perform operations including: when the determined function corresponds to an input function, displaying, on the first screen, a result screen based on the input function, and displaying, on the second screen, an interface corresponding to the input function.

In various example embodiments of the present disclosure, the memory stores instructions which, when executed by the processor, cause the processor to perform operations including: when the determined function corresponds to a selection function, displaying, on the first screen, a selection screen for selecting one of multiple objects, and displaying, on the second screen, a screen corresponding to the selected object.

In various example embodiments of the present disclosure, wherein the memory stores instructions which, when executed by the processor, cause the processor to perform an operation of: displaying a screen corresponding to the determined angle on at least one of the first screen and the second screen.

In various example embodiments of the present disclosure, wherein the memory stores instructions which, when executed by the processor, cause the processor to perform an operation of: determining whether the electronic device is in a horizontal state on the basis of a sensing value sensed by the sensor module.

In various example embodiments of the present disclosure, wherein the memory stores instructions which, when executed by the processor, cause the processor to perform an operation of: determining whether an angle between the first body and the second body is within a predetermined range.

In various example embodiments of the present disclosure, the electronic device may further include a connection unit configured to rotatably connect the first body and the second body.

In various example embodiments of the present disclosure, the connection unit may include at least one of a hinge configured to rotatably connect the first body and the second body, a flexible member, and a stretchable member.

In various example embodiments of the present disclosure, an electronic device may include: a display capable of being modified into multiple areas; a sensor module configured to sense a movement state of the electronic device; a memory; and a processor electrically connected to the memory, wherein the display includes a first body including a first display including a plurality of first display areas and a second body including a second display including a plurality of second display areas, the first body and the second body being rotatably connected to each other, and a memory configured to store instructions which, when executed by the processor, cause the processor to perform operations including: determining an angle between the first body and the second body and the movement state of the electronic device based on a sensing value sensed by the sensor module; and displaying a first screen on the first display and displaying a second screen on the second display based on the determined movement state of the electronic device and the determined angle.

Various example embodiments disclosed herein are provided simply to aid in a description of the present disclosure and to aid the understanding of the present disclosure, and are not intended to limit the scope of the present disclosure. Therefore, it should be understood that all modifications and changes or modified and changed forms based on the present disclosure fall within the scope of the present disclosure.

What is claimed is:

1. A method of operating an electronic device including multiple displays, the method comprising:
   identifying an angle between a first body and a second body of an electronic device, the electronic device comprising the first body including a first display and the second body including a second display, the second body being rotatably connected to the first body;
   identifying whether the angle between the first body and the second body is within a predetermined range;
   in response to identifying that the angle between the first body and the second body is within the predetermined range, identifying a movement state of the electronic device, wherein the movement state is identified as a portable state in response to detecting a movement of the electronic device larger than a predetermined threshold via at least one of a gyro sensor or an acceleration sensor in a predetermined period of time, and the movement state is identified as a mounted state in response to a failure to detect the movement of the electronic device larger than the predetermined threshold via at least one of the gyro sensor or the acceleration sensor in the predetermined period of time; and
   displaying a first screen on the first display and displaying a second screen on the second display based on the identified movement state of the electronic device and the identified angle, wherein the first screen corresponding to the portable state is different than the first screen corresponding to the mounted state.

2. An electronic device comprising:
   a plurality of displays including a first display and a second display;
   a first body including the first display;
   a second body including the second display, the second body being rotatably connected to the first body;
   a sensor module, including at least one of a gyro sensor or an acceleration sensor, configured to detect a movement state of the electronic device;
   a memory; and
   a processor electrically connected to the memory, wherein the memory stores instructions which, when executed by the processor, cause the processor to perform operations comprising:
      identifying an angle between the first body and the second body based on a sensing value sensed by the sensor module;
      identifying whether the angle between the first body and the second body is within a predetermined range;
      in response to identifying that the angle between the first body and the second body is within the predetermined range, identifying the movement state of the electronic device based on the sensing value sensed detected by at least one of the gyro sensor or the acceleration sensor, wherein the movement state is identified as a portable state in response to detecting a movement of the electronic device larger than a predetermined threshold via at least one of the gyro sensor or the acceleration sensor in a predetermined period of time, and the movement state is identified as a mounted state in response to a failure to detect the movement of the electronic device larger than the predetermined threshold via at least one of the gyro sensor or the acceleration sensor in the predetermined period of time; and
      displaying a first screen on the first display and displaying a second screen on the second display based on the identified movement state of the electronic device and the identified angle, wherein the first screen corresponding to the portable state is different from the first screen corresponding to the mounted state.

3. The electronic device of claim 2, wherein the memory stores instructions which, when executed by the processor, cause the processor to perform operations comprising: identifying a function corresponding to at least one of the first screen and the second screen.

4. The electronic device of claim 3, wherein the memory stores instructions which, when executed by the processor, cause the processor to perform operations comprising:
   when the electronic device is in the portable state, displaying, on the first screen, a first user interface related to the identified function; and
   when the electronic device is in the mounted state, displaying, on the first screen, a second user interface related to the identified function.

5. The electronic device of claim 4, wherein the memory stores instructions which, when executed by the processor, cause the processor to perform operations comprising:
   displaying an entire function related to the identified function through the first user interface; and
   displaying some functions related to the identified function through the second user interface.

6. The electronic device of claim 3, wherein the memory stores instructions which, when executed by the processor, cause the processor to perform operations comprising:
   when the identified function corresponds to an input function, displaying, on the first screen, a result screen based on the input function, and displaying, on the second screen, an interface corresponding to the input function.

7. The electronic device of claim 3, wherein the memory stores instructions which, when executed by the processor, cause the processor to perform operations comprising:
   when the identified function corresponds to a selection function, displaying, on the first screen, a selection screen for selecting one of multiple objects; and displaying, on the second screen, a screen corresponding to the selected object.

8. The electronic device of claim 2, wherein the memory stores instructions which, when executed by the processor, cause the processor to perform operations comprising:
displaying a screen corresponding to the identified angle on at least one of the first screen and the second screen.

9. The electronic device of claim 2, wherein the memory stores instructions which, when executed by the processor, cause the processor to perform operations comprising:
identifying whether the electronic device is in a horizontal state based on a sensing value detected by the gyro sensor.

10. The electronic device of claim 2, further comprising: a connection assembly through which the first body and the second body are rotatably connected to each other.

11. The electronic device of claim 10, wherein the connection assembly comprises a hinge rotatably connecting the first body and the second body.

12. An electronic device comprising:
a display comprising multiple areas;
a sensor module, including at least one of a gyro sensor or an acceleration sensor, configured to detect a movement state of the electronic device;
a memory; and
a processor electrically connected to the memory,
wherein the memory stores instructions which, when executed by the processor, cause the processor to perform operations comprising:
identifying an angle between a first display area of the multiple areas and a second display area of the multiple areas based on a sensing value sensed by the sensor module;
in response to identifying that the angle between the first display area and the second display area is within a predetermined range, identifying the movement state of the electronic device based on the sensing value detected by the sensor module, wherein the movement state is identified as a portable state in response to detecting a movement of the electronic device lager than a predetermined threshold via at least one of the gyro sensor or the acceleration sensor in a predetermined period of time, and the movement state is identified as a mounted state in response to a failure to detect the movement of the electronic device larger than the predetermined threshold via at least one of the gyro sensor or the acceleration sensor in the predetermined period of time; and
displaying a first screen on the first display area and displaying a second screen on the second display area based on the identified movement state of the electronic device and the determined angle, wherein the first screen corresponding to the portable state is different from the first screen corresponding to the mounted state.

13. The electronic device of claim 12, wherein the memory stores instructions which, when executed by the processor, cause the processor to perform operations comprising: identifying a function corresponding to at least one of the first screen and the second screen.

14. The electronic device of claim 13, wherein the memory stores instructions which, when executed by the processor, cause the processor to perform operations comprising:
displaying, on the first screen, a first user interface related to the function when the electronic device is in the portable state; and
displaying, on the first screen, a second user interface related to the identified function when the electronic device is in the mounted state,
wherein the memory stores instructions which, when executed by the processor, cause the processor to perform operations comprising:
displaying an entire function related to the identified function through the first user interface; and
displaying some functions related to the identified function through the second user interface.

15. The electronic device of claim 13, wherein the memory stores instructions which, when executed by the processor, cause the processor to perform operations comprising:
when the identified function corresponds to an input function, displaying, on the first screen, a result screen based on the input function, and displaying, on the second screen, an interface corresponding to the input function.

16. The electronic device of claim 13, wherein the memory stores instructions which, when executed by the processor, cause the processor to perform operations comprising:
when the identified function corresponds to a selection function, displaying, on the first screen, a selection screen for selecting one of multiple objects, and displaying, on the second screen, a screen corresponding to the selected object.

17. The electronic device of claim 12, wherein the memory stores instructions which, when executed by the processor, cause the processor to perform operations comprising:
displaying a screen corresponding to the identified angle on least one of the first screen and the second screen.

* * * * *